United States Patent [19]
Chana

[11] Patent Number: 4,502,845
[45] Date of Patent: Mar. 5, 1985

[54] MULTISTAGE GEAR PUMP AND CONTROL VALVE ARRANGEMENT
[75] Inventor: Howard E. Chana, Troy, Mich.
[73] Assignee: General Motors Corporation, Detroit, Mich.
[21] Appl. No.: 478,248
[22] Filed: Mar. 24, 1983
[51] Int. Cl.³ .............................................. F04B 49/08
[52] U.S. Cl. ...................................... 417/288; 417/428
[58] Field of Search ................ 417/288, 302, 303, 304, 417/428

[56] References Cited
U.S. PATENT DOCUMENTS 4,204,811  5/1980  Carter et al. ........................ 417/288
4,245,964  1/1981  Rannenberg ..................... 417/288 X Primary Examiner—Richard E. Gluck
Attorney, Agent, or Firm—R. L. Phillips

[57] ABSTRACT

There is disclosed a multistage gear pump and control valve arrangement comprising two hydraulic gear pump sets each having a suction port connected to a common sump and a discharge port for delivering hydraulic fluid to a circuit line. Only one of the discharge ports is continuously open to the circuit line while a check valve operates to connect the other of the discharge ports to the circuit line and prevent reverse flow. A regulator valve regulates the pump discharge to the circuit line by diverting fluid therefrom in response to circuit line pressure below a predetermined setting while both the discharge ports are delivering fluid thereto and by being responsive to circuit line pressures thereabove to connect the other discharge port to the sump to thereby relieve the associated gear pump set of hydraulic work while again regulating the pump discharge to the circuit line by diverting fluid therefrom but with only the one discharge port delivering fluid thereto.

3 Claims, 1 Drawing Figure

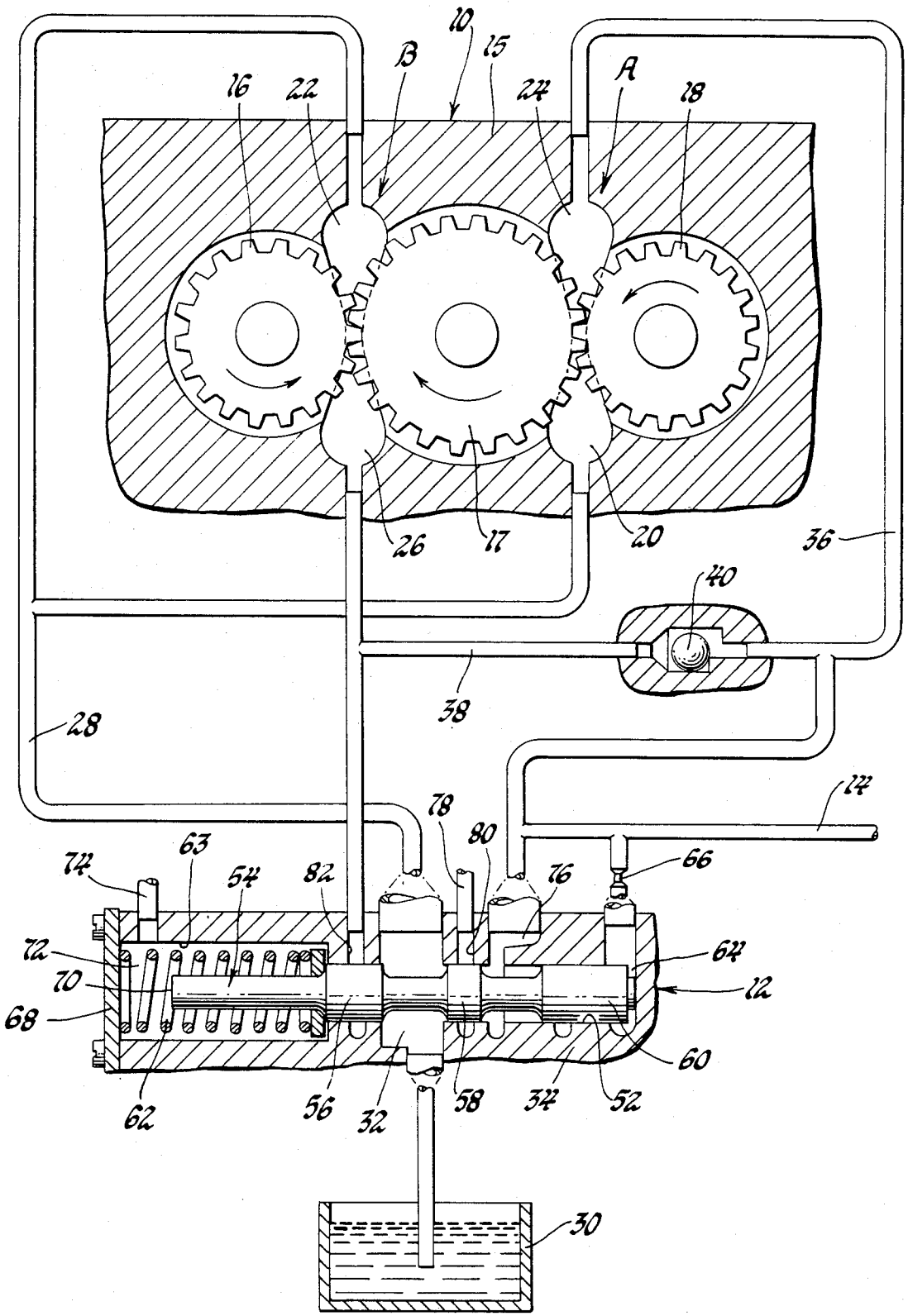

MULTISTAGE GEAR PUMP AND CONTROL VALVE ARRANGEMENT

This invention relates to fluid pumping systems and more particularly to a multistage gear pump and regulator valve arrangement.

In an effort to reduce pump pumping losses in vehicle automatic transmissions and thereby improve fuel economy and performance, one solution is to employ a variable capacity vane type pump instead of the fixed capacity gear type pump that is normally used. The vane type pump, however, has low volumetric efficiency and is expensive to manufacture.

The present invention is directed to meeting this same goal utilizing the higher volumetric efficiency and lower cost of the gear type pump. This is accomplished with a simple multistage gear pump and flow regulator valve arrangement. The pump section comprises at lest two gear pump sets each having a suction port connected to draw hydraulic fluid from a common sump and a discharge port connected to feed the fluid to a circuit line such as the main line of a vehicle automatic transmission having a hydraulic torque converter. Only one of the discharge ports, however, is continuously open to the main line while a check valve operates to connect the other discharge port to the main line and prevent reverse flow. The regulator valve is ported, biased and connected so as to regulate the pump discharge to the main line by diverting fluid therefrom to the converter in response to main line pressure below a predetermined setting while both gear pump sets are delivering fluid thereto from their respective discharge port and by being responsive to main line pressures thereabove to divert fluid directly from the said other discharge port to the sump whereupon the check valve then closes. The latter sequence has the effect of then relieving the associated gear pump set of hydraulic work while the regulator valve then regulates the flow supplied by only the one gear pump set.

These and other objects, advantages and features of the present invention will become more apparent from the following description and drawing of the preferred embodiment of the invention which is shown schematically in the drawing.

Referring to the drawing, there is shown a two-stage gear pump 10 and a flow regulator valve 12 which are arranged and particularly adapted to supply the main line 14 in a vehicle automatic transmission circuit of conventional type (the remainder of which is not shown). The pump 10 comprises a pump housing 15 containing and rotatably supporting three gears 16, 17 and 18. The gears 16 and 18 are of the same size while the gear 17 is of larger size and is located intermediate of and meshes at diametrically opposite locations with the two other gears. Any of the gears, but preferably the central gear 17 is driven by a power source (not shown) to rotate in the direction indicated by the arrow with the other gears resultantly forced to turn in the directions indicated by the arrows appearing thereon. The housing 15 is shaped about the gears such that two gear pump sets A (17, 18) and B (16, 17) are formed each having a suction port 20, 22 and a pressure or discharge port 24, 26 respectively. Both of the suction ports 20, 22 are continuously connected by a suction line 28 to a commom sump 30 via a port 32 formed in the regulator valve housing 34. The discharge port 24 of pump set A is continuously openly connected via a pressure or discharge line 36 directly to the main line 14 of the automatic transmission circuit. The discharge port 26 of the other pump set B is not so continuously open to the circuit line 14 in that it is connected by a pressure or discharge line 38 and thence a check valve 40 to the other discharge line 36 and thus to the main line. The check valve 40 operates to permit flow from the discharge line 38 of pump set B to the main line 14 but prevents reverse flow as described in more detail later.

The valve housing 34 of regulator valve 12 has a bore 52 in which a spool valve 54 is mounted for reciprocal movement. The spool valve 54 has three axially spaced lands 56, 58 and 60 of equal diameter closely fitting in the bore 52 and is biased rightward by a coil spring 62 mounted in a cavity 63 in the valve housing at the left end of the valve bore. The right hand end of valve bore 52 is closed to form a chamber 64 that communicates with the main line 14 through a damping orifice 66. A plate 68 is secured to the opposite end of the valve housing in addition to serving as a seat for the spring 62 and a stop for the projecting stem end 70 of the valve, closes off the cavity 63 to form a chamber 72 to which a signal pressure can be communicated by a pressure signal line 74 as described in more detail later. The main line 14 and directly connected pump discharge line 36 are connected to the valve bore 52 by a port 76 which is blocked in the valve position shown between the lands 58 and 60 while the suction line 28 is connected by the port 32 and between the lands 56 and 58 with the sump 30 and remains connected therewith via the port 32 in all positions of the valve. A converter feed line 78 which may be utilized to feed some particular circuit in the transmission such as the converter is connected by a port 80 to the valve bore 52 but is blocked in the valve position shown by the land 58. The other pump discharge line 38 is connected by a port 82 to the valve bore 52 but is blocked in the valve position shown by the land 56.

Alternatively, the valve 54 is movable leftward against the bias of spring 62 by pressure buildup in the chamber 64 to uncover the converter feed port 80 thereby communicating the main line 14 therewith between the lands 58 and 60 while the suction line 28 remains open to the sump via port 32 and the land 56 continues to block the port 82 connected with the discharge line 38 of pump set B. Continued pressure buildup in the chamber 64 is effective to move the valve 54 further leftward with the connection between the main line 14 and converter feed port 80 maintained but now the discharge line 38 is connected between the lands 56 and 58 with the port 32 and thus with the suction line 28 leading to the sump to thereby relieve the pressure on pump set B.

Having described the basic operations of the regulator valve 12, their role may be better understood by a typical operation of the valve in serving the automatic transmission circuit. For example, when the transmission circuit requires high flows from the main line 14, both pump sets A and B feed this line and draw their fluid (oil) from the sump 30. Then as relative pump capacity is increased by either increased input speed or restricted line demand, pressure buildup in the line 14 operates on the regulator valve 54 through the damping orifice 66. When the force generated by the pressure in chamber 64 on the end of valve land 60 overcomes the spring force and that provided by some, if any, signal pressure in the chamber 72 acting on the exposed end area of land 56, the regulator valve moves to the left uncovering the converter feed port 80 so that oil in the main line 14 is now diverted to the line 78 which is at lower pressure and which in this case supplies the converter. As oil supply continues to increase, the valve 54 continues to move to the left and the next sequence is for the port 82 to connect with the port 32. With such connection to suction, the pressure in the discharge port 26 of pump set B drops to zero. The check valve 40 then closes because of the resulting pressure differential thereacross so that main line pressure is maintained in the discharge port 24 of pump set A while the hydraulic work now done by pump set B is zero. Then as flow from pump set A continues to increase and exceed line requirement, the regulator valve moves further to the left connecting the main line port 76 to the suction port 32 and pressure regulation of the pump set A then occurs. As pump capacity decreases or flow demands increase, the system will operate in reverse order to meet this demand. In addition, the pressure from signal line 74 on the regulator valve is provided to allow changes in line pressure by such means as throttle controls, manifold pressure etc. depending upon the application of the invention. For example, depending upon the signal pressure delivered, the line pressure may be made to increase or decrease according to the operation desired in the circuit being served. Furthermore, it will be appreciated that while the preferred embodiment is particularly adapted to serve a transmission hydraulic circuit it will be understood that such mutlistage pump and flow regulator valve arrangement is readily adaptable with two or more gear pump sets to other control circuits having similar demands wherein it is desired to reduce the pumping losses without sacrificing substantial volumetric efficiency in meeting a broad range of flow requirements. In the preferred embodiment shown, the two gear pump sets are very simply provided by a three gear meshing arrangement while the regulator valve employs a simple spring biased spool valve. However, it will be understood that for increased capacity four gears could be made to form three pump sets, etc. and that the regulator valve could be simply modified as well to handle the additional pump set(s).

The above described preferred embodiment is thus illustrative of the invention which may be modified within the scope of the appended claims.

The embodiments of the invention in which an exclusive property or privilege is claimed are defined as follows:

1. A multistage gear pump and control valve arrangement comprising at least two hydraulic gear pump sets each having a suction port connected to a common sump and a discharge port for delivering hydraulic fluid to both a main circuit line and a secondary circuit line, only one of said discharge ports being continuously open to said main circuit line, a check valve for connecting the other of said discharge ports to said main circuit line and preventing reverse flow, and regulator valve means for regulating the pump discharge to said main circuit line by maintaining delivery thereto of the discharge from both said discharge ports below a first predetermined main circuit line pressure setting and diverting fluid therefrom to said secondary line to thereby also deliver pump discharge to the latter line in response to the main circuit line pressure increasing above said first predetermined setting while both said discharge ports are delivering fluid thereto and being responsive to main circuit line pressure increasing above a second predetermined setting to connect said other discharge port to said sump to thereby effect closure of said check valve and relieve the associated gear pump set of hydraulic work while again regulating the pump discharge to said main circuit line by first diverting fluid therefrom to said secondary circuit line as before but with only said one discharge port delivering fluid thereto and then on further increase in main circuit line pressure above a third predetermined setting regulating the pump discharge by said one discharge port to both said circuit lines by diverting fluid therefrom to said sump.

2. A multistage gear pump and control valve arrangement comprising at least two hydraulic gear pump sets each having a suction port connected to a common sump and a discharge port for delivering hydraulic fluid to both a main circuit line and a secondary circuit line, only one of said discharge ports being continuously open to said main circuit line, a check valve for connecting the other of said discharge ports to said main circuit line and preventing reverse flow, regulator valve means for regulating the pump discharge to said main circuit line by maintaining delivery thereto of the discharge from both said discharge ports below a first predetermined main circuit line pressure setting and diverting fluid therefrom to said secondary circuit line to thereby also deliver pump discharge to the latter line in response to the main circuit line pressure increasing above said first predetermined setting while both said discharge ports are delivering fluid thereto and being responsive to main circuit line pressure increasing above a second predetermined setting setting to connect said other discharge port to said sump to thereby effect closure of said check valve and relieve the associated gear pump set of hydraulic work while again regulating the pump discharge to said main circuit line by first diverting fluid therefrom to said secondary circuit line as before but with only said one discharge port delivering fluid thereto and then on further increase in main circuit line pressure above a third predetermined setting regulating the pump discharge by said one discharge port to both said circuit lines by diverting fluid therefrom to said sump, and said regulator valve means being further responsive to a signal pressure to control main circuit line pressure.

3. A two-stage gear pump and control valve arrangement comprising three gears meshing so as to form two hydraulic gear pump sets, each said pump set having a suction port connected to a common sump and a discharge port for delivering hydraulic fluid to both a main circuit line and a secondary circuit line, only one of said discharge ports being continuously open to said main circuit line, a check valve for connecting the other of said discharge ports to said main circuit line and preventing reverse flow, and regulator valve means comprising a spool valve biased by a spring and the pressure in said main circuit line for regulating the pump discharge to said main circuit line by maintaining delivery thereto of the discharge from both said discharge ports below a first predetermined main circuit line pressure setting and diverting fluid therefrom to said secondary circuit line to thereby also deliver pump discharge to the latter line in response to the main circuit line pressure increasing above said first predetermined setting while both said discharge ports are delivering fluid thereto and being responsive to main circuit line pressure increasing above a second predetermined setting to connect said other discharge port to said sump to thereby relieve the associated gear pump set of hydraulic work while again regulating the pump discharge to said main circuit line by first diverting fluid therefrom to said secondary circuit line as before but with only said one discharge port delivering fluid thereto and then on further increase in main circuit line pressure above a third predetermined setting regulating the pump discharge by said one discharge port to both said circuit lines by diverting fluid therefrom to said sump.

* * * * *